United States Patent
Yoon et al.

(10) Patent No.: US 9,191,040 B2
(45) Date of Patent: Nov. 17, 2015

(54) APPARATUS AND METHOD FOR RADIO FREQUENCY TRANSMISSION

(71) Applicant: Samsung Electronics Co., Ltd., Suwon-si (KR)

(72) Inventors: Chol Su Yoon, Yongin-si (KR); Hyoung Hwan Roh, Seoul (KR); Il Jong Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/157,002

(22) Filed: Jan. 16, 2014

(65) Prior Publication Data

US 2014/0209680 A1    Jul. 31, 2014

(30) Foreign Application Priority Data

Jan. 25, 2013    (KR) .................. 10-2013-0008682

(51) Int. Cl.
*H04B 1/04* (2006.01)
*G06K 7/10* (2006.01)

(52) U.S. Cl.
CPC .......... *H04B 1/0475* (2013.01); *G06K 7/10217* (2013.01); *G06K 7/10316* (2013.01); *H04B 1/0483* (2013.01)

(58) Field of Classification Search
CPC ............... G06K 19/0723; G06K 19/07749; G06K 7/10316; G06K 7/10217; H01Q 1/2225; A01B 12/006; H04B 1/0475

USPC .......................................... 235/492, 451, 439
See application file for complete search history.

(56) References Cited

U.S. PATENT DOCUMENTS

| | | | |
|---|---|---|---|
| 5,712,592 A | 1/1998 | Stimson et al. | |
| 6,940,349 B2 | 9/2005 | Hellberg | |
| 7,458,513 B2 * | 12/2008 | Ibi et al. | 235/451 |
| 7,783,254 B2 | 8/2010 | Raggam et al. | |
| 7,961,813 B2 | 6/2011 | Tanaka et al. | |
| 8,115,598 B2 | 2/2012 | Rofougaran et al. | |
| 2008/0136516 A1 * | 6/2008 | Afsahi | 330/148 |
| 2011/0013677 A1 * | 1/2011 | Ibrahim et al. | 375/219 |
| 2011/0306295 A1 | 12/2011 | Butler et al. | |
| 2012/0052825 A1 | 3/2012 | Southcombe et al. | |
| 2012/0062230 A1 * | 3/2012 | Vaughan et al. | 324/318 |

FOREIGN PATENT DOCUMENTS

KR        100341625        6/2002

* cited by examiner

*Primary Examiner* — Kristy A Haupt

(74) *Attorney, Agent, or Firm* — Onello & Mello, LLP

(57) ABSTRACT

A radio frequency (RF) transmission circuit includes an antenna connection terminal, a plurality of amplifiers connected to the antenna connection terminal in parallel, a plurality of drivers for driving the plurality of amplifiers, and a control circuit configured to control operation of the plurality of drivers based on information indicating a characteristic of a RF signal to be transmitted through the antenna connection terminal.

19 Claims, 18 Drawing Sheets

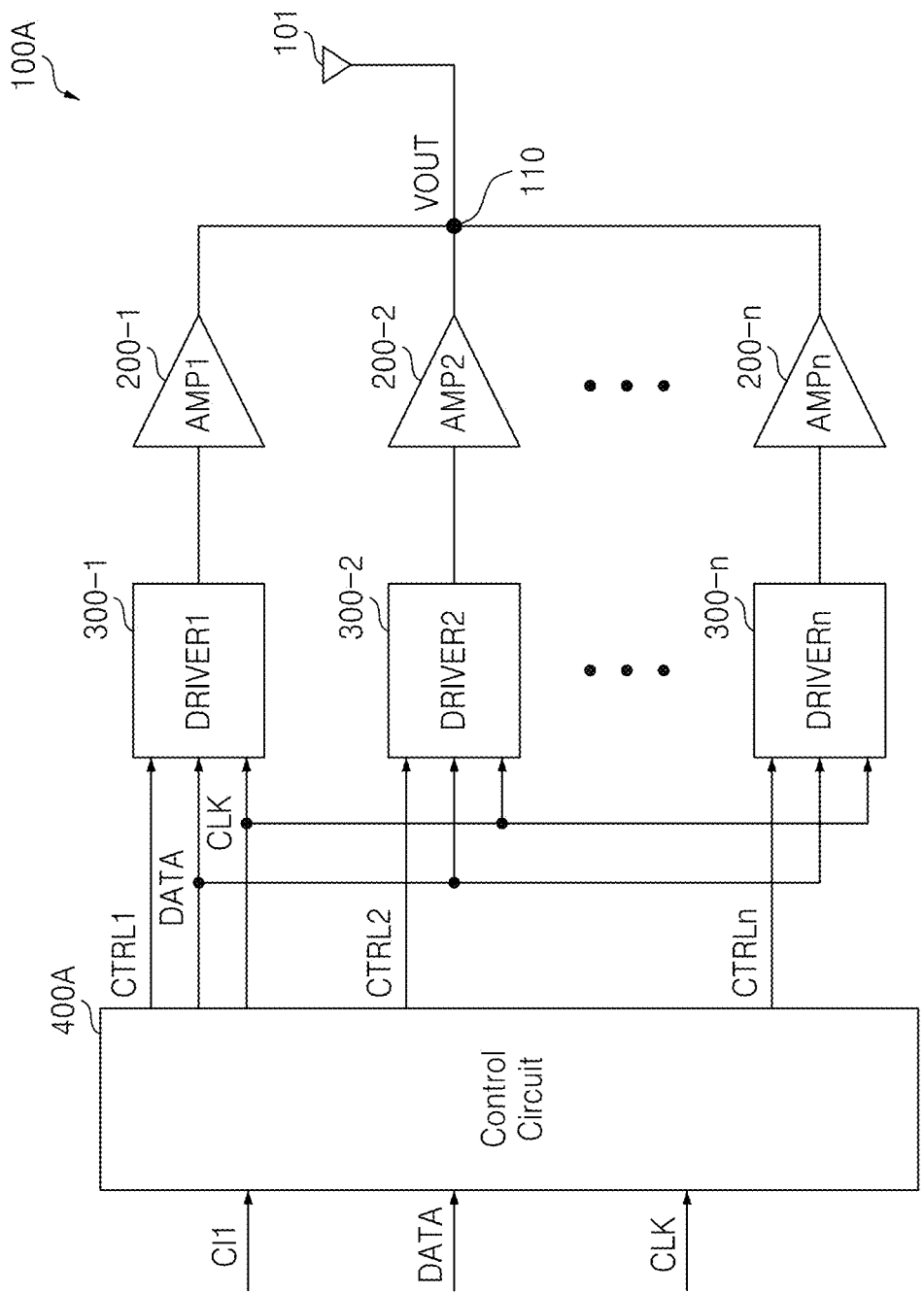

APPARATUS AND METHOD FOR RADIO FREQUENCY TRANSMISSION

CROSS-REFERENCE TO RELATED APPLICATIONS

This application claims priority under 35 U.S.C. §119 from Korean Patent Application No. 10-2013-0008682 filed on Jan. 25, 2013 the disclosure of which is hereby incorporated by reference in its entirety.

BACKGROUND

Exemplary embodiments in accordance with principles of inventive concepts relate to a radio frequency (RF) transmission device, and more particularly to a RF transmission circuit which may reduce overshoot and undershoot occurring when transmitting data using an RF signal.

In order to transmit the data and the power using the radio frequency (RF), a power amplifier with a large output may be employed. When wirelessly communicating through an antenna, a high voltage may be momentarily supplied to the antenna and an overshoot voltage and an undershoot voltage may occur in the antenna. Such overshoot and undershoot voltages may be mistaken for a data signal, thereby causing an error or malfunction to occur.

SUMMARY

Exemplary embodiments in accordance with principles of inventive concepts are directed to a radio frequency (RF) transmission circuit including: an antenna connection terminal; a plurality of amplifiers connected to the antenna connection terminal in parallel; a plurality of drivers for driving the plurality of amplifiers; and a control circuit controlling the operation of the plurality of drivers based on characteristic information indicating a characteristic of a radio frequency (RF) signal to be transmitted through the antenna connection terminal.

Exemplary embodiments in accordance with principles of inventive concepts include an RF transmission circuit wherein each of the plurality of amplifiers has a different amplification capability.

Exemplary embodiments in accordance with principles of inventive concepts include an RF transmission circuit wherein each of the plurality of amplifiers is a class-D power amplifier.

Exemplary embodiments in accordance with principles of inventive concepts include an RF transmission circuit wherein the control circuit is configured to sequentially drive the plurality of drivers, based on the characteristic information.

Exemplary embodiments in accordance with principles of inventive concepts include an RF transmission circuit wherein the control circuit is configured to control the number of drivers to be enabled among the plurality of drivers, based on the characteristic information.

Exemplary embodiments in accordance with principles of inventive concepts include an RF transmission circuit wherein the characteristic information indicates potential overshoot or undershoot of the RF signal.

Exemplary embodiments in accordance with principles of inventive concepts include an RF transmission circuit comprising a memory to store operation information corresponding to the characteristic information, and wherein the control circuit is configured to control each operation of the plurality of drivers based on the operation information.

Exemplary embodiments in accordance with principles of inventive concepts include an RF reader that includes an RF transmission circuit, including: an antenna connection terminal; a plurality of amplifiers connected to the antenna connection terminal in parallel; a plurality of drivers for driving the plurality of amplifiers; and a control circuit controlling the operation of the plurality of drivers based on characteristic information indicating a characteristic of a radio frequency (RF) signal to be transmitted through the antenna connection terminal and an antenna connected to the antenna connection terminal.

Exemplary embodiments in accordance with principles of inventive concepts include an RF reader that includes a plurality of amplifiers having different RF amplification capability.

Exemplary embodiments in accordance with principles of inventive concepts include a wireless communication device that includes an RF transmission circuit including: an antenna connection terminal; a plurality of amplifiers connected to the antenna connection terminal in parallel; a plurality of drivers for driving the plurality of amplifiers; and a control circuit controlling the operation of the plurality of drivers based on characteristic information indicating a characteristic of a radio frequency (RF) signal to be transmitted through the antenna connection terminal and an antenna connected to the antenna connection terminal; and a controller controlling operation of the RF transmission circuit.

Exemplary embodiments in accordance with principles of inventive concepts include a wireless communications device wherein the control circuit is configured to determine the number and the order of drivers to be enabled among the plurality of drivers, based on the characteristic information.

Exemplary embodiments in accordance with principles of inventive concepts include an RF transmission circuit comprising: an antenna connection terminal; a plurality of amplifiers connected to the antenna connection terminal in parallel; a plurality of drivers for driving the plurality of amplifiers; a measuring circuit to measure a characteristic of a radio frequency (RF) signal to be transmitted through the antenna connection terminal, and to output a plurality of measuring signals; and a control circuit to control operation of the plurality of drivers based on the plurality of measuring signals.

Exemplary embodiments in accordance with principles of inventive concepts include an RF reader comprising: an antenna connection terminal; a plurality of amplifiers connected to the antenna connection terminal in parallel; a plurality of drivers for driving the plurality of amplifiers; a measuring circuit to measure a characteristic of a radio frequency (RF) signal to be transmitted through the antenna connection terminal, and to output a plurality of measuring signals; and a control circuit to control operation of the plurality of drivers based on the plurality of measuring signals; and an antenna connected to the antenna connection terminal.

Exemplary embodiments in accordance with principles of inventive concepts include a wireless communication device comprising: an antenna connection terminal; a plurality of amplifiers connected to the antenna connection terminal in parallel; a plurality of drivers for driving the plurality of amplifiers; a measuring circuit to measure a characteristic of a radio frequency (RF) signal to be transmitted through the antenna connection terminal, and to output a plurality of measuring signals; and a control circuit to control operation of the plurality of drivers based on the plurality of measuring signals; an antenna connected to the antenna connection terminal; and a controller to control operation of the RF transmission circuit.

Exemplary embodiments in accordance with principles of inventive concepts include a method of operating a RF transmission circuit comprising: determining the number and the enabling order of drivers to be enabled among a plurality of drivers based on characteristic control signals indicating a characteristic of a radio frequency (RF) signal to be transmitted through an antenna connection terminal where an associated plurality of amplifiers are connected in parallel; and driving a RF input signal using at least one driver among the plurality of drivers, as indicated by the determination result.

Exemplary embodiments in accordance with principles of inventive concepts include a contactless smart card reader, comprising: an antenna connection terminal; a plurality of amplifiers connected in parallel to the antenna connection terminal; a controller configured to control the plurality of amplifiers based on characteristics of a signal to be transmitted by the contactless smart card reader.

Exemplary embodiments in accordance with principles of inventive concepts include a contactless smart card reader further comprising semiconductor memory, wherein characteristics of the signal to be transmitted are stored within the semiconductor memory.

Exemplary embodiments in accordance with principles of inventive concepts include a contactless smart card reader further comprising a feedback circuit connected to the antenna connection terminal and configured to determine the characteristics of the signal.

Exemplary embodiments in accordance with principles of inventive concepts include a contactless smart card reader, wherein the controller is configured to operate the plurality of amplifiers to reduce overshoot and undershoot of the signal to be transmitted by the contactless smart card reader.

Exemplary embodiments in accordance with principles of inventive concepts include a contactless smart card reader, wherein the controller activates an increasing number of amplifiers in sequence to form a signal having reduced overshoot.

BRIEF DESCRIPTION OF THE DRAWINGS

These and/or other aspects and advantages of inventive concepts will become apparent and more readily appreciated from the following description of exemplary embodiments, taken in conjunction with the accompanying drawings of which:

FIG. 4 is a block diagram of a RF transmission circuit according to an exemplary embodiment in accordance with principles of inventive concepts;

DETAILED DESCRIPTION

Figure 1:
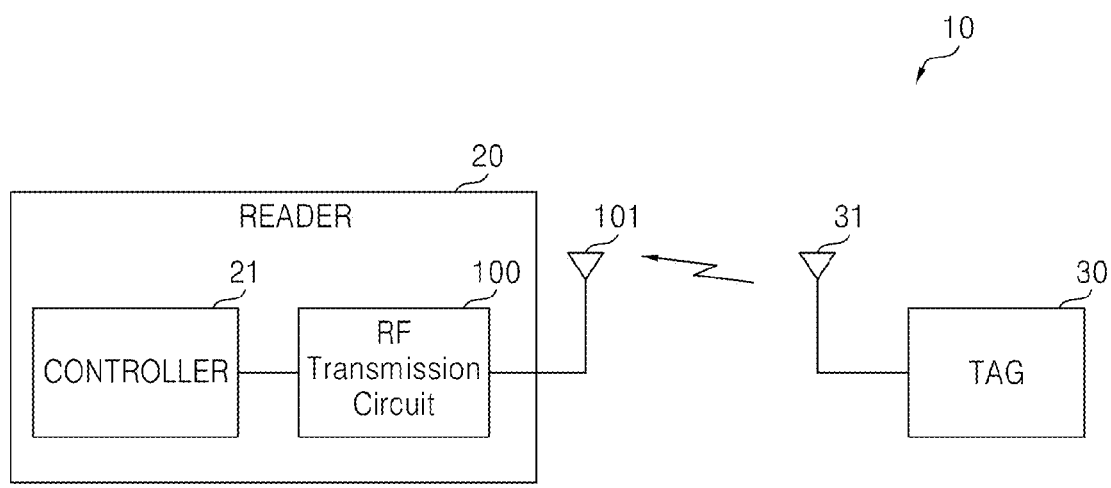
FIG. 1 is a block diagram of a short-range wireless communication system according to an exemplary embodiment in accordance with principles of inventive concepts.

Various exemplary embodiments will be described more fully hereinafter with reference to the accompanying drawings, in which exemplary embodiments are shown. Exemplary embodiments may, however, be embodied in many different forms and should not be construed as limited to exemplary embodiments set forth herein. Rather, these exemplary embodiments are provided so that this disclosure will be thorough, and will convey the scope of exemplary embodiments to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. The term "or" is used in an inclusive sense unless otherwise indicated.

It will be understood that, although the terms first, second, third, for example. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments in accordance with principles of inventive concepts will be explained in detail with reference to the accompanying drawings.

FIG. 1 is a block diagram of a short-range wireless communication system according to exemplary embodiments in accordance with principles of inventive concepts. A short-range wireless communication system 10, which may be a near field communications system, for example, includes a reader 20 and a tag 30. For example, the tag 30 may be a smart card. The short-range wireless communication system 10 may be embodied in a security system or a payment system, for example.

The reader 20 may be embodied in a part of a wireless communication device or a portable electronic device. In exemplary embodiments in accordance with principles of inventive concepts, the portable electronic device may be a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), or an e-book, for example.

In exemplary embodiments in accordance with principles of inventive concepts, the reader 20 transmits an RF signal (which may include RF power) and data to the tag 30 through an antenna 101, and receives a RF signal and data (the data may also be transmitted via an RF signal) transmitted from the tag 30.

The reader 20, which may function as a transmitter to transmit RF signals to tag 30 in order to read the contents of tag 30, includes a controller 21 and a RF transmission circuit 100. In exemplary embodiments in accordance with principles of inventive concepts, the controller 21 generates at least one control signal and data which are necessary for operation of the RF transmission circuit 100, for example, a transmitting operation or a receiving operation. The RF transmission circuit 100 performs a wireless communication with a receiver, for example, the tag 30, based on the at least one control signal and the data.

The RF transmission circuit 100 supplies an RF signal (which may include RF power) and data to the antenna 101 so as to transmit data to the tag 30 according to the controller 21, and the antenna 101 forms a time-varying electro-magnetic field in order to transmit signals from transmission circuit 100. The tag 30 receives RF signals, which may include data, output from the reader 20. The data may be transmitted in a form of the RF signal.

The tag 30 may analyze the RF signal output from the reader 20, generate data corresponding to the analysis result, and transmit the generated data to the antenna 101 of the reader 20 through an antenna 31. The data may be transmitted to the reader 20 in the form of an RF signal.

The RF transmission circuit 100 may receive a RF signal from the tag 30, analyze the received RF signal according to control of the controller 21, and recognize the tag 30 or extract data transmitted from the tag 30 according to the analysis result. The RF transmission circuit 100, according to data output from the controller 21, drives the antenna 101, and the antenna 101 forms a corresponding time-varying electro-magnetic field.

The tag 30 analyzes a RF signal based on the time-varying electro-magnetic field formed by the reader 20, generates response data according to the analysis result, and outputs the generated response data to the reader 20 in the form of the RF signal through the antenna 31.

Figure 2:
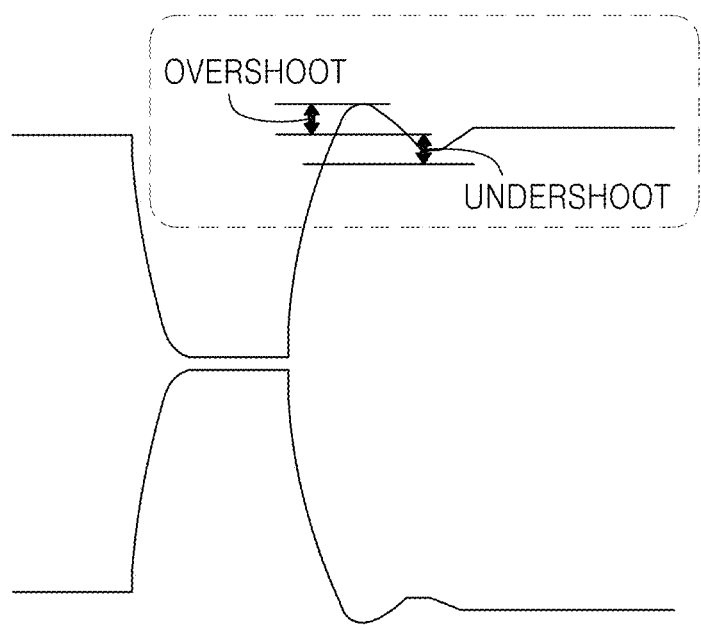
FIG. 2 depicts a RF characteristic parameter induced from an antenna of FIG. 1.

FIG. 2 depicts a RF characteristic parameter induced from the antenna of FIG. 1. When the RF transmission circuit 100 drives the antenna 101, an RF characteristic parameter is different according to impedance of the antenna 101. The RF characteristic parameter induced from the antenna 101 includes the overshoot and the undershoot. In exemplary embodiments in accordance with principles of inventive concepts, RF transmission circuit 100 has a structure that may reduce the overshoot and the undershoot and thereby reduces errors.

Figure 3A:
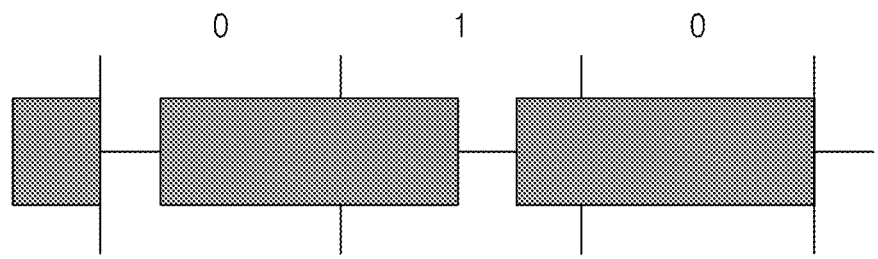
FIGS. 3A and 3B depict a data waveform of ISO 14443A and a data waveform of ISO14443B, respectively.
Figure 3B:
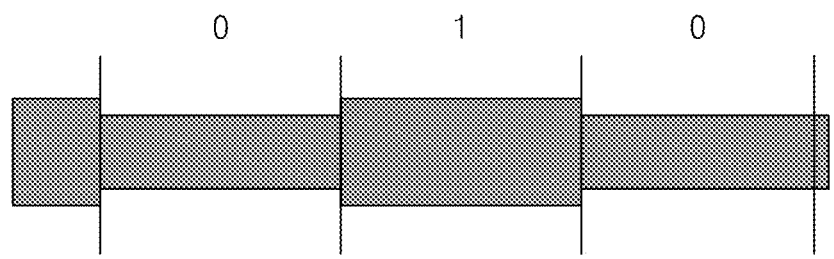

FIGS. 3A and 3B depict a data waveform of ISO 14443A and a data waveform of ISO14443B, respectively. ISO/IEC 14443 is an international standard for Contactless Smart Cards operating at 13.56 MHz in close proximity with a reader antenna. FIG. 3A is a data waveform according to International Standardization Organization (ISO) 14443A, and FIG. 3B is a data waveform according to ISO 14443B.

FIG. 4 is a block diagram of an exemplary embodiment of an RF transmission circuit in accordance with principles of inventive concepts. Referring to FIGS. 1 and 4, an RF transmission circuit 100A according to an example embodiment of RF transmission circuit 100 includes an antenna connection terminal 110, a plurality of amplifiers 200-1 to 200-n, where n is a natural number, a plurality of drivers 300-1 to 300-n, and a control circuit 400A.

The antenna 101 may be connected to the antenna connection terminal 110. According to the type of the antenna 101 which may be connected to the antenna connection terminal 110, the number and the order of drivers enabled among the plurality of drivers 300-1 to 300-n may be determined in accordance with principles of inventive concepts.

The plurality of amplifiers 200-1 to 200-n is connected to the antenna connection terminal 101 in parallel. Each of the plurality of amplifiers 200-1 to 200-n may be embodied in a class-D power amplifier having a different amplifying capability or amplification ratio, for example. Each of the plurality of drivers 300-1 to 300-n may drive each of the plurality of amplifiers 200-1 to 200-n. Each of the plurality of drivers 300-1 to 300-n may have a different RF signal driving capability or size.

The control circuit 400A may control the operation of each of the plurality of drivers 300-1 to 300-n based on characteristic information CI1, which indicates a characteristic of a RF signal to be transmitted through the antenna connection terminal 110, data DATA, and a clock signal CLK. For example, the control circuit 400A may output each of a plurality of control signals CTRL1 to CTRLn which may enable or disable each of the plurality of drivers 300-1 to 300-n. Accordingly, the control circuit 400A may control or determine the number and/or the enabling order of drivers to be enabled among the plurality of drivers 300-1 to 300-n based on the characteristic information CI1.

Each of the drivers 300-1 to 300-n may drive each of the amplifiers 200-1 to 200-n based on each of the control signals CTRL1 to CTRLn, the data DATA, and the clock signal CLK.

In exemplary embodiments in accordance with principles of inventive concepts, at least one of the characteristic information CI1, the data, and the clock signal CLK may be output from the controller 21. The characteristic information CI1 may include information on a characteristic of a RF signal to be transmitted through the antenna connection terminal 110 and the antenna 101 (or a RF power characteristic of the antenna 101), for example, information related to potential overshoot and undershoot.

For convenience of description in FIG. 4, both the RF transmission circuit 100A and the antenna 101 are illustrated. For convenience of description in FIG. 4, an exemplary embodiment in accordance with principles of inventive concepts in which the control circuit 400A controls each of the plurality of drivers 300-1 to 300-n is illustrated; however, other embodiments, such as one in which the control circuit 400A may control each operation of the plurality of amplifiers 200-1 to 200-n based on the characteristic information CI1, are contemplated within the scope of inventive concepts.

Figure 5:
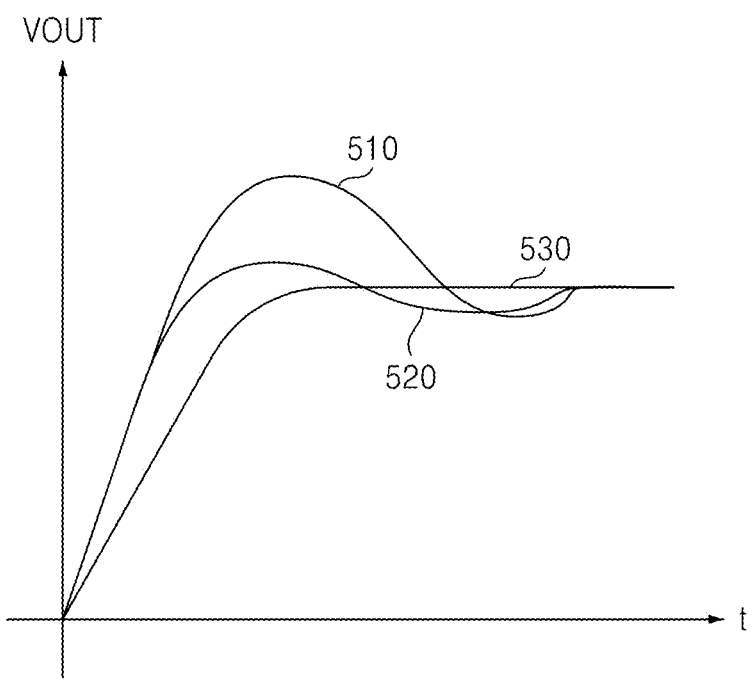
FIG. 5 depicts a RF power characteristic of the antenna according to an exemplary embodiment in accordance with principles of inventive concepts.

FIG. 5 depicts an RF power characteristic of antenna 101 according to an exemplary embodiment in accordance with principles of inventive concepts. Referring to FIGS. 4 and 5, when the characteristic information CI1 indicates a waveform like a drawing number 510, the control circuit 400A activates the plurality of control signals CTRL1 to CTRLn so as to enable all of the plurality of drivers 300-1 to 300-n in response to the characteristic information CI1 having a first code, for example, '00'.

When all of the plurality of drivers 300-1 to 300-n are enabled, a waveform of an output signal VOUT corresponding to the power characteristic of the antenna 101 includes the overshoot and the undershoot which are relatively large, as indicated by drawing number 510.

When the characteristic information CI1 indicates a waveform as indicated by drawing, or trace, number 520, the control circuit 400A activates only some control signals CTRL1 and CTRL2 so as to enable some drivers, for example, 300-1 and 300-2, among the plurality of drivers 300-1 to 300-n in response to the characteristic information CI1 having a second code, for example, '01'.

When only some drivers, for example, 300-1 to 300-2, are enabled, a waveform of the output signal VOUT corresponding to the power characteristic of the antenna 101 includes the overshoot and the undershoot which are relatively small as indicated by drawing number 520.

When the characteristic information CI1 indicates a waveform as indicated by drawing number 530, the control circuit 400A activates only one control signal CTRLn so as to enable one driver, for example, 300-n, among the plurality of drivers 300-1 to 300-n in response to the characteristic information CI1 having a third code, for example, '10'.

When only one driver, for example, 300-n, is enabled, a waveform of the output signal VOUT corresponding to the power characteristic of the antenna 101 includes the overshoot and the undershoot which are relatively very small as indicated by drawing number 530. As described above, the control circuit 400A may analyze the characteristic information CI1, and adjust the number and the enabling order of drivers to be enabled among the plurality of drivers 300-1 to 300-n according to the analysis result.

Figure 6:
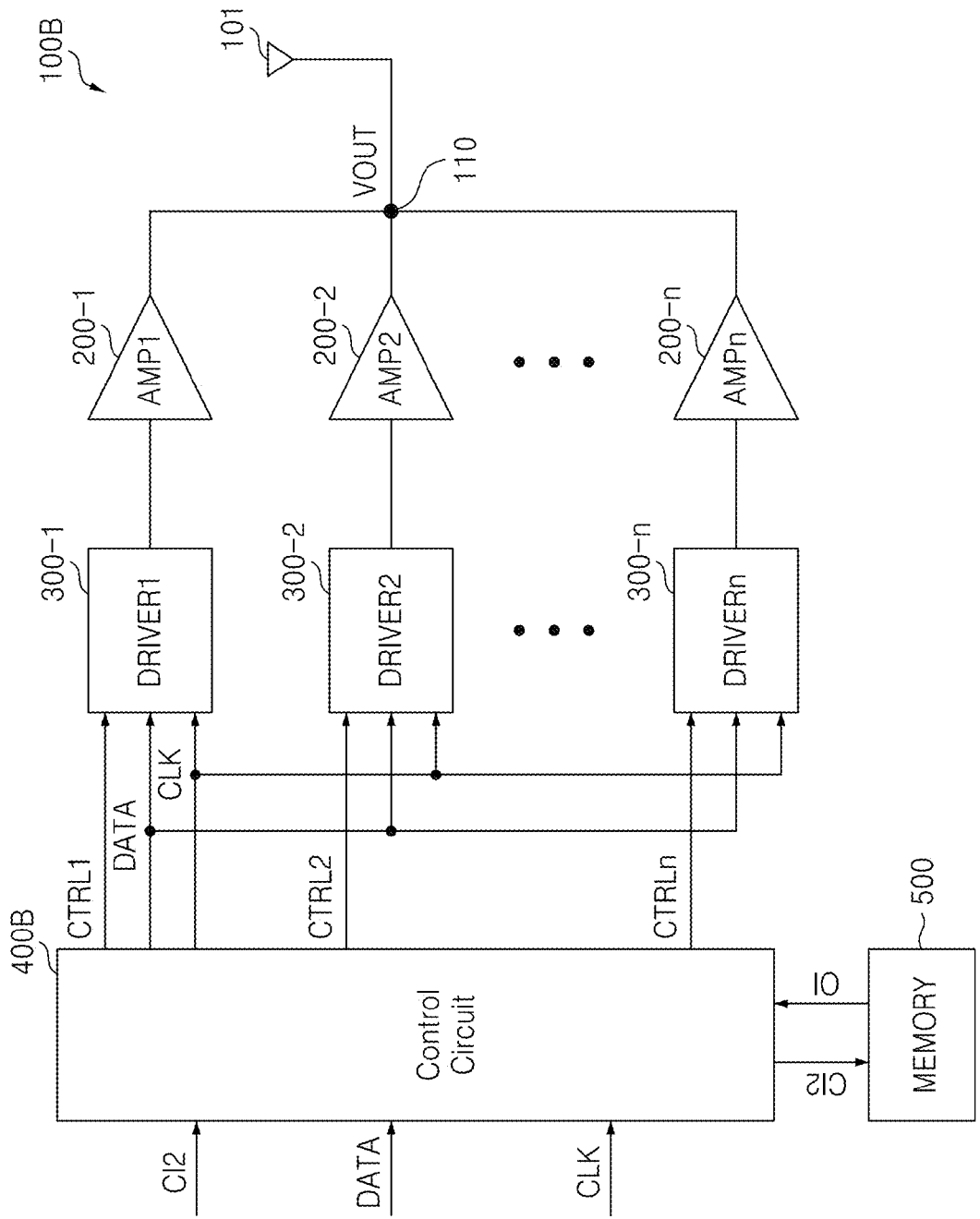
FIG. 6 is a block diagram of a RF transmission circuit including a memory according to another exemplary embodiment in accordance with principles of inventive concepts.

FIG. 6 is a block diagram of a RF transmission circuit including a memory according to another exemplary embodiment in accordance with principles of inventive concepts. Referring to FIGS. 1 and 6, a RF transmission circuit 100B according to another exemplary embodiment of the RF transmission circuit 100 in accordance with principles of inventive concepts includes the antenna connection terminal 110, the plurality of amplifiers 200-1 to 200-n, the plurality of drivers 300-1 to 300-n, the control circuit 400B, and a memory 500.

The control circuit 400B may read operation information OI stored in the memory 500 according to characteristic information CI2 that indicates a characteristic of a RF signal to be transmitted through the antenna connection terminal 110 and the antenna 101, and control each operation of the plurality of drivers 300-1 to 300-n based on the read operation information OI. For example, the control circuit 400B may control each operation of the plurality of drivers 300-1 to 300-n based on operation information OI, data DATA, and a clock signal CLK.

In exemplary embodiments in accordance with principles of inventive concepts, characteristic information CI2 and the operation information OI correspond to each other, so that first operation information OI corresponding to the characteristic information CI2 having first values may indicate a waveform like the drawing number 510 of FIG. 5, second operation information OI corresponding to the characteristic information CI2 having second values may indicate a waveform like the drawing number 520 of FIG. 5, and third operation information OI corresponding to the characteristic information CI2 having third values may indicate a waveform like the drawing number 530 of FIG. 5.

Figure 7:
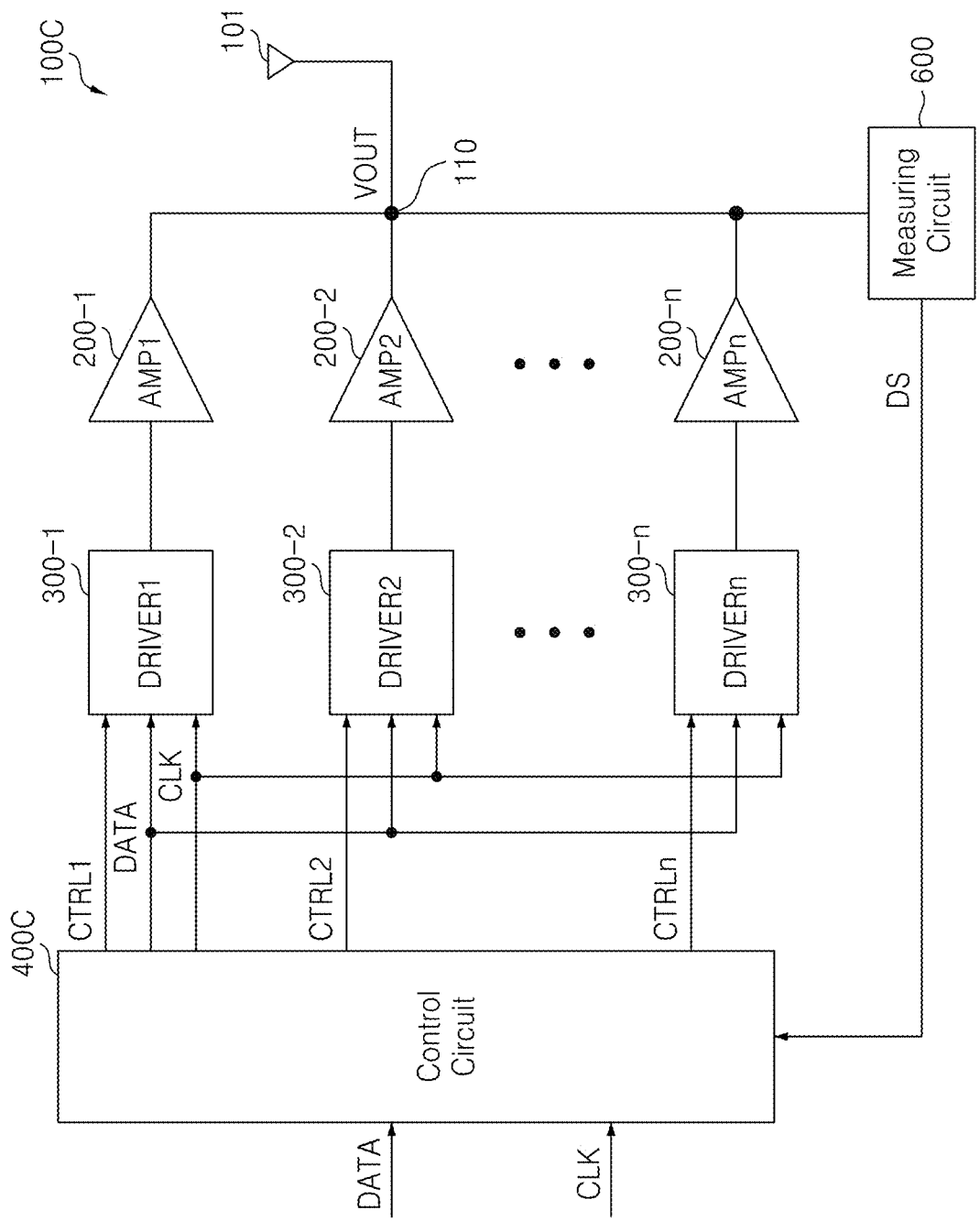
FIG. 7 is a block diagram of the RF transmission circuit including a measuring circuit according to another exemplary embodiment in accordance with principles of inventive concepts.

FIG. 7 is a block diagram of an RF transmission circuit including a measuring circuit according to another exemplary embodiment in accordance with principles of inventive concepts. Referring to FIG. 7, an RF transmission circuit 100C according to an exemplary embodiment of the RF transmission circuit 100 includes the antenna connection terminal 110, the plurality of amplifiers 200-1 to 200-n, the plurality of drivers 300-1 to 300-n, the control circuit 400C, and a measuring circuit 600.

In accordance with principles of inventive concepts, measuring circuit 600 measures the characteristic of the RF signal to be transmitted through the antenna connection terminal 110, for example, overshoot and undershoot, and outputs a plurality of measuring signals DS to the control circuit 400C according to the measurement result. The control circuit 400C may control each operation of the plurality of drivers 300-1 to 300-n based on the plurality of measuring signals DS, data DATA, and a clock signal CLK.

The plurality of measuring signals DS may indicate information corresponding to each waveform 510, 520, or 530 of each output signal VOUT illustrated in FIG. 5. For example, based on the plurality of measuring signals DS, the data DATA, and the clock signal CLK, the control circuit 400C may output each of the plurality of control signals CTRL1 to CTRLn which may enable or disable each of the plurality of drivers 300-1 to 300-n. Accordingly, in accordance with principles of inventive concepts, the control circuit 400C may control the number and the enabling order of drivers to be enabled among the plurality of drivers 300-1 to 300-n based on the plurality of measuring signals DS.

For example, the measuring circuit 600 may generate the plurality of measuring signals DS on-the fly. Accordingly, the control circuit 400C may control the number and the enabling order of drivers to be enabled among the plurality of drivers 300-1 to 300-n on-the fly.

Figure 8:
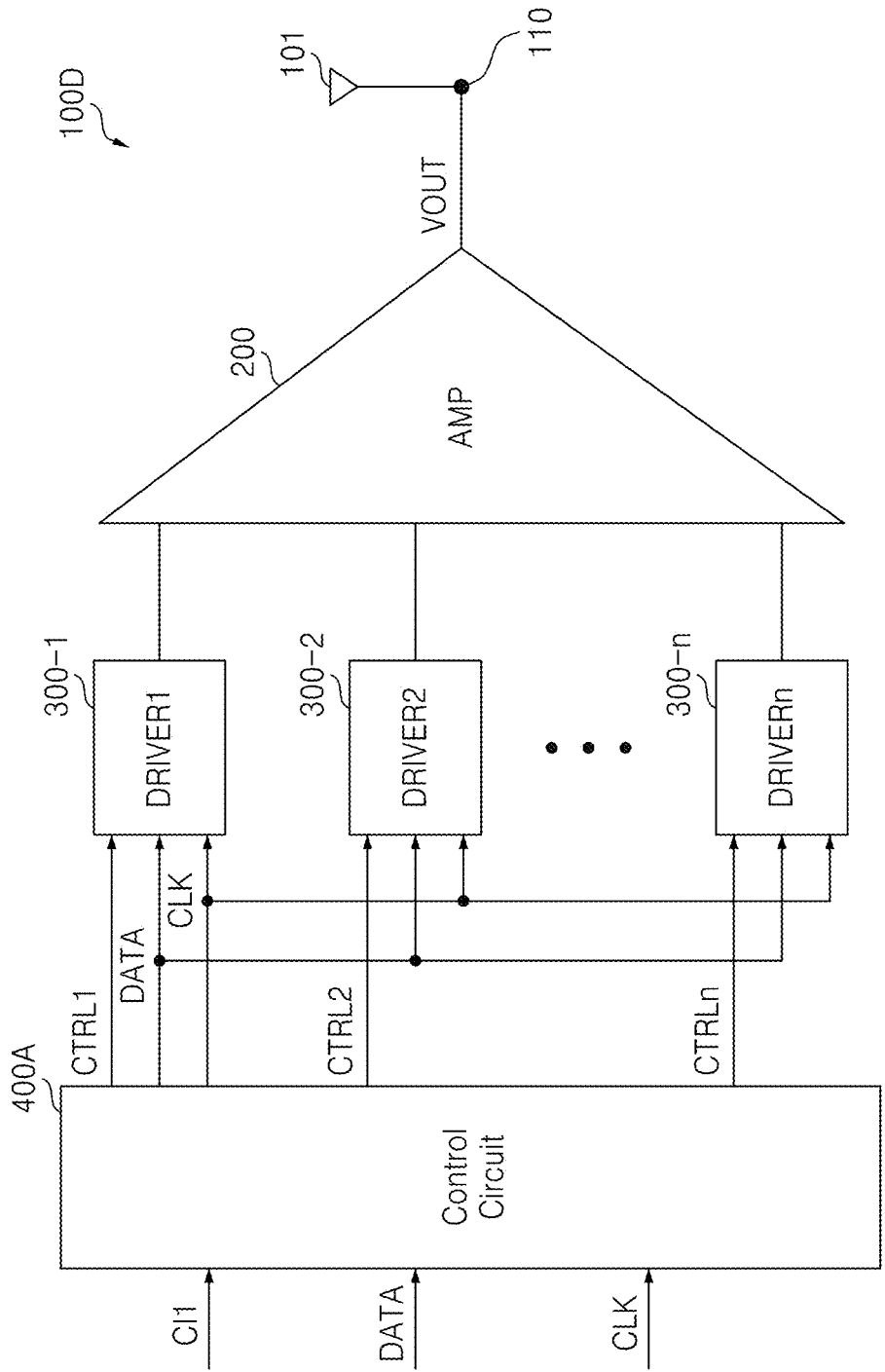
FIG. 8 is a block diagram of the RF transmission circuit including an amplifier according to another exemplary embodiment in accordance with principles of inventive concepts.

FIG. 8 is a block diagram of the RF transmission circuit including an amplifier according to another exemplary embodiment in accordance with principles of inventive concepts. Except that the plurality of amplifiers 200-1 to 200-n is replaced with one amplifier 200, the structure and a function of the RF transmission circuit 100A in FIG. 4 are the same as a structure and a function of the RF transmission circuit 100D in FIG. 8.

The amplifier 200 may include a plurality of unit amplifiers (not shown) which share the antenna connection terminal and are connected to each other in parallel. A unit amplifier(s) corresponding to a driver(s) enabled among the plurality of drivers 300-1 to 300-n may amplify a signal(s) output from the enabled drivers(s).

Figure 9:
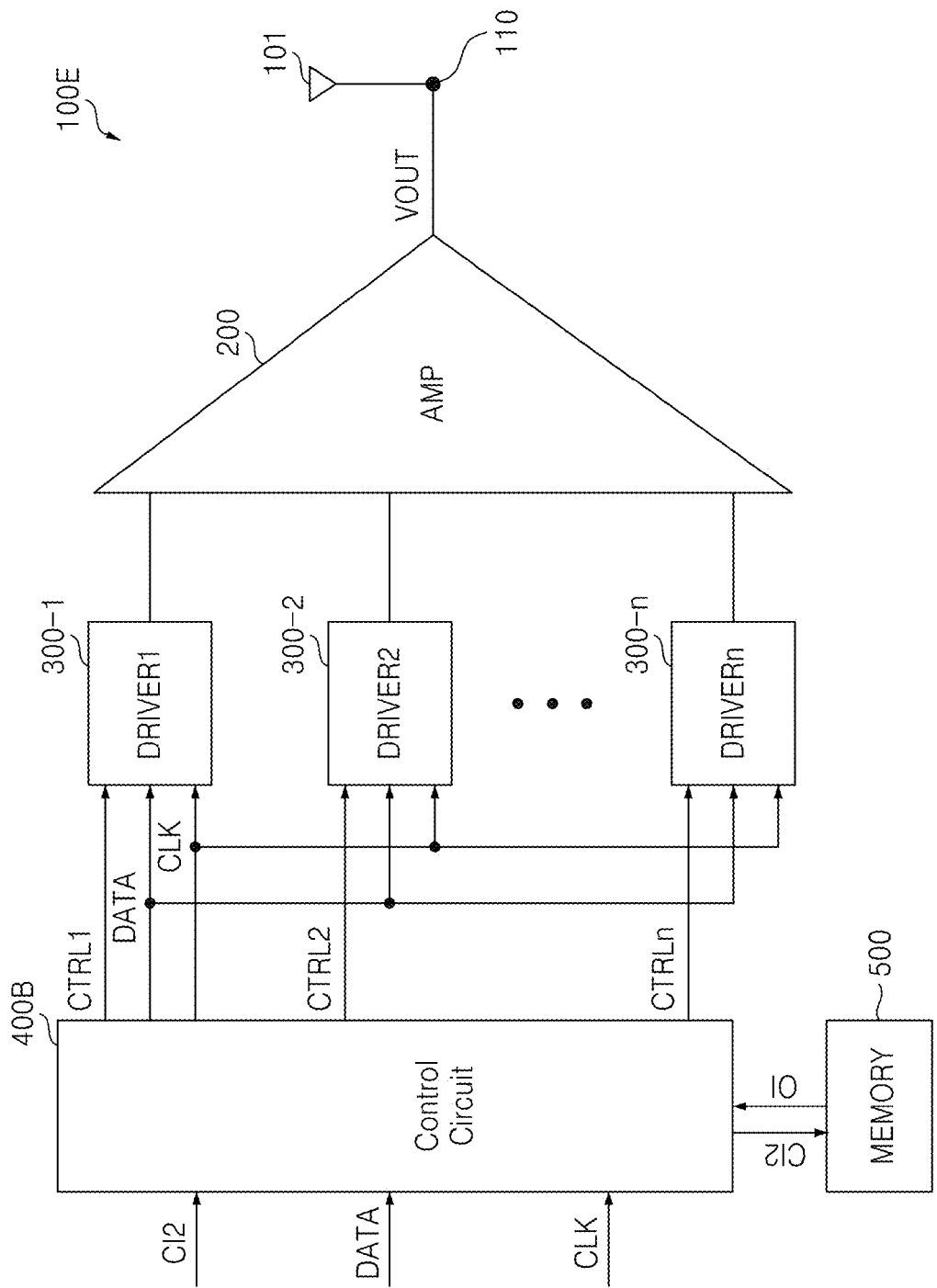
FIG. 9 is a block diagram of the RF transmission circuit including an amplifier and a memory according to another exemplary embodiment in accordance with principles of inventive concepts.

FIG. 9 is a block diagram of the RF transmission circuit including an amplifier and a memory according to another exemplary embodiment in accordance with principles of inventive concepts. Except that the plurality of amplifiers 200-1 to 200-n is replaced with the amplifier 200, the structure and a function of the RF transmission circuit 100B in FIG. 6 are the same as the structure and function of the RF transmission circuit 100E in FIG. 9.

The amplifier 200 may include a plurality of unit amplifiers (not shown) which share the antenna connection terminal and are connected to each other in parallel. A unit amplifier(s) corresponding to an enabled driver(s) among the plurality of drivers 300-1 to 300-n may amplify a signal(s) output from the enabled driver(s).

Figure 10:
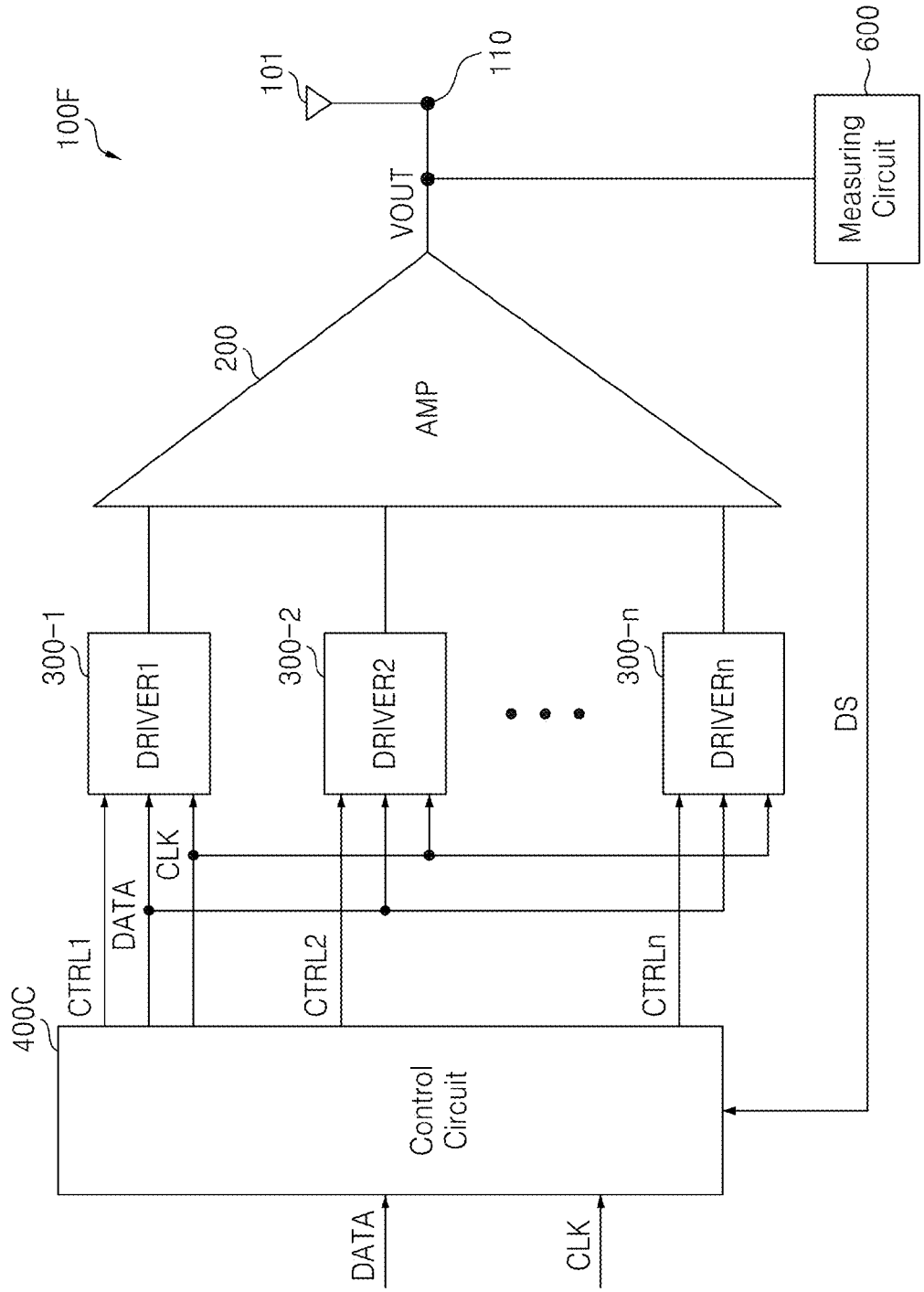
FIG. 10 is a block diagram of the RF transmission circuit including an amplifier and a measuring circuit according to another exemplary embodiment in accordance with principles of inventive concepts.

FIG. 10 is a block diagram of the RF transmission circuit including an amplifier and a measuring circuit according to another exemplary embodiment in accordance with principles of inventive concepts. Except that the plurality of amplifiers 200-1 to 200-n is replaced with the amplifier 200, the structure and a function of the RF transmission circuit 100C in FIG. 7 are the same as the structure and function of a RF transmission circuit 100F in FIG. 10.

The amplifier 200 may include a plurality of unit amplifiers (not shown) which share the antenna connection terminal and are connected to each other in parallel. A unit amplifier(s) corresponding to a driver(s) enabled among the plurality of drivers 300-1 to 300-n may amplify a signal(s) output from the enabled driver(s).

Figure 11:
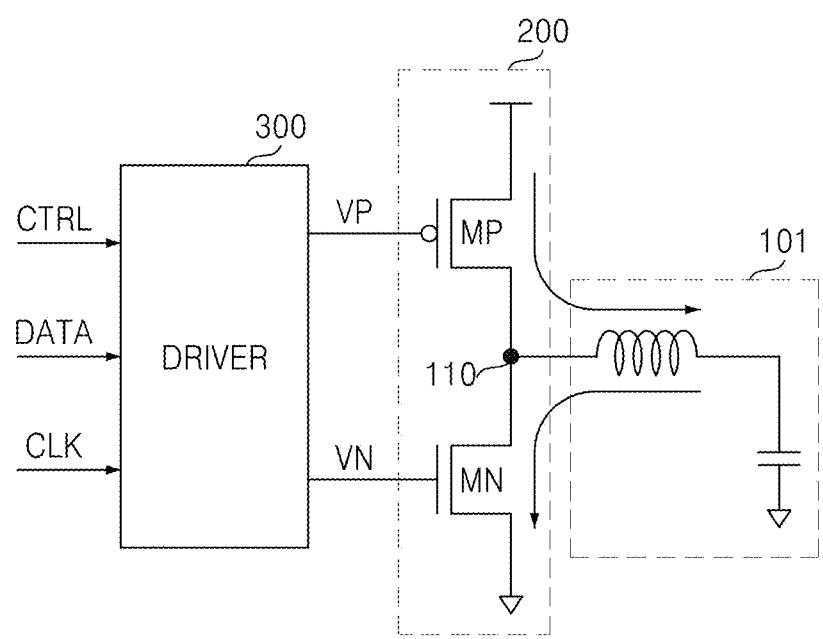
FIG. 11 is a block diagram of the RF transmission circuit including a driver and the amplifier for describing the present inventive concepts.

FIG. 11 is a block diagram of an RF transmission circuit including a driver and amplifier for describing exemplary embodiments in accordance with inventive concepts. Referring to FIGS. 1 to 11, the antenna 101 connected to the antenna connection terminal 110 includes a coil (or inductor) and a capacitor, and when a RF signal (or RF power) is input to the antenna 101, the antenna 101 forms a time-varying electro-magnetic field.

An amplifier (200-1 to 200-n, and 200, collectively '200') supplies the RF signal to the antenna 101. In exemplary embodiments in accordance with principles of inventive concepts, amplifier 200 includes a P-type transistor MP and a N-type transistor MN connected between a power and a ground in series.

Driver (300-1 to 300-n, and 300, collectively '300') generates a plurality of driving signals VP and VN for driving the amplifier 200 in response to input signals CTRL, DATA, and CLK.

In exemplary embodiments in accordance with principles of inventive concepts, in response to a first driving signal VP having a low level, the P-type transistor MP supplies a voltage or a current to the antenna 101 through the antenna connection terminal 110, and in response to a second driving signal VN having a high level, the N-type transistor MN connects the antenna connection terminal 110 to a ground.

Figure 12A:
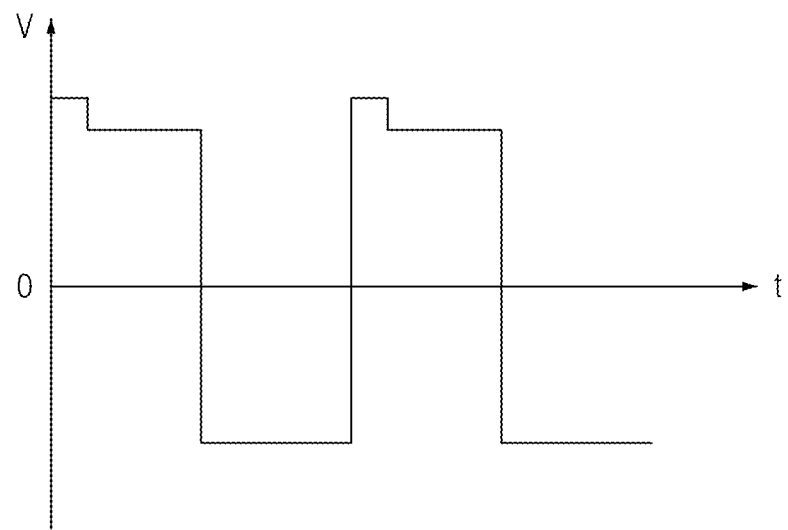
FIGS. 12A and 12B are waveform diagrams each depicting a voltage characteristic and a current characteristic in the RF transmission circuit of FIG. 11.
Figure 12B:
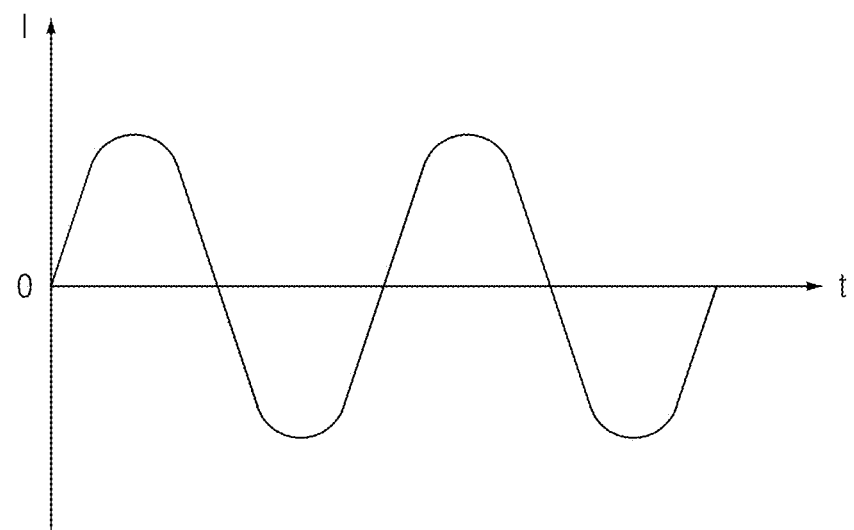

FIGS. 12A and 12B are waveform diagrams respectively depicting a voltage characteristic and a current characteristic in the RF transmission circuit in FIG. 11. As illustrated in FIG. 12A, a voltage of data DATA is a rectangular waveform as illustrated in FIG. 12A, and a current of the amplifier 200 is a sinusoidal waveform as illustrated in FIG. 12B.

Figure 13:
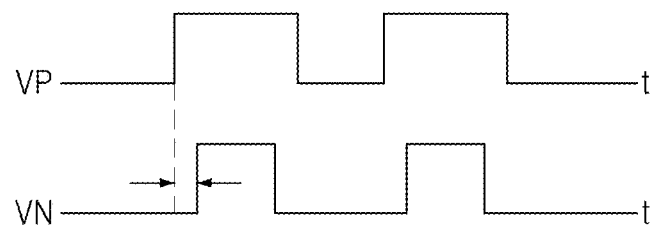
FIG. 13 depicts a waveform of driving signals driving an amplifier of the RF transmission circuit of FIG. 11.

FIG. 13 depicts a waveform of driving signals driving the amplifier of the RF transmission circuit in FIG. 11. Referring to FIGS. 11 and 13, a plurality of driving signals VP and VN has a waveform in which the P-type transistor MP and the N-type transistor MN are not simultaneously turned on or turned off. Accordingly, the overshoot and the undershoot are reduced by the plurality of driving signals VP and VN. That is, drive signals VP and VN are shaped to reduce both overshoot and undershoot in signals applied to antenna 101.

Figure 14:
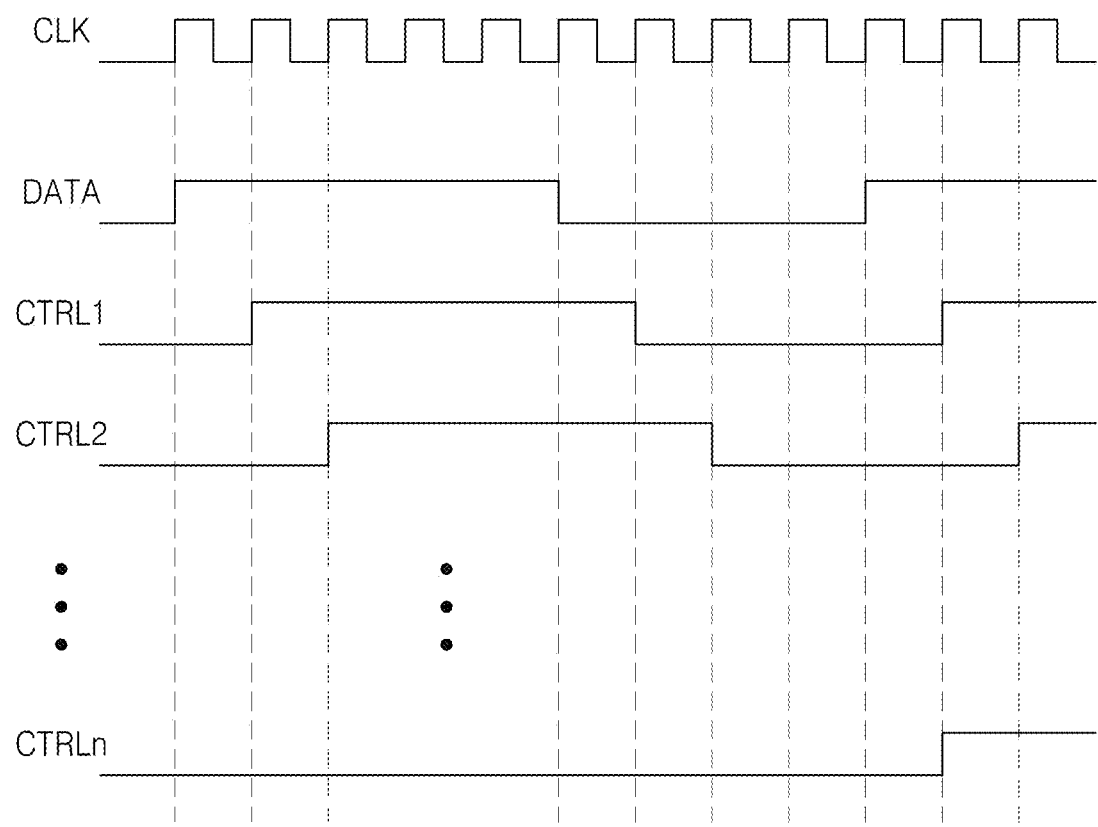
FIG. 14 depicts a waveform of control signals sequentially driving amplifiers according to an exemplary embodiment in accordance with principles of inventive concepts.

FIG. 14 depicts a waveform of control signals sequentially driving amplifiers according to an exemplary embodiment in accordance with principles of inventive concepts. A control circuit (400A, 400B, or 400C; collectively '400') sequentially generates a plurality of control signals CTRL1 to CTRLn in response to a clock signal CLK, data DATA, and characteristic control signals CI1, CI2, OI, or DS.

In this exemplary embodiment in accordance with principles of inventive concepts, the characteristic control signals correspond to the characteristic information CI1 of FIGS. 4 and 8, the characteristic information CI2 and the operation signal OI of FIGS. 6 and 9, and a plurality of detection signals DS in FIGS. 7 and 10.

In accordance with principles of inventive concepts, control circuit 400 sequentially shifts data DATA according to a clock signal CLK, and sequentially generates the plurality of control signals CTRL1 to CTRLn. Each of the plurality of drivers 300-1 to 300-$n$ is sequentially enabled in response to each of the plurality of control signals CTRL1 to CTRLn, and each of the plurality of amplifiers 200-1 to 200-$n$ amplifies a signal output from each of the plurality of drivers 300-1 to 300-$n$ which are sequentially enabled and transmits the amplified signal to the antenna 101 through the antenna connection terminal 110.

As described above, the control circuit 400 may control the number and the enabling order of drivers enabled among the plurality of drivers 300-1 to 300-$n$ in response to a clock signal CLK, data DATA, and characteristic control signals CI1, CI2, OI, or DS. By controlling the drivers in this manner, that is, by sequentially enabling and disabling them as indicated in FIG. 14, the rise and fall times of the signal applied to the antenna 101 may be more precisely controlled and, as a result, overshoot and undershoot may be more precisely controlled, as described in greater detail in the discussion relate to FIG. 15.

Figure 15:
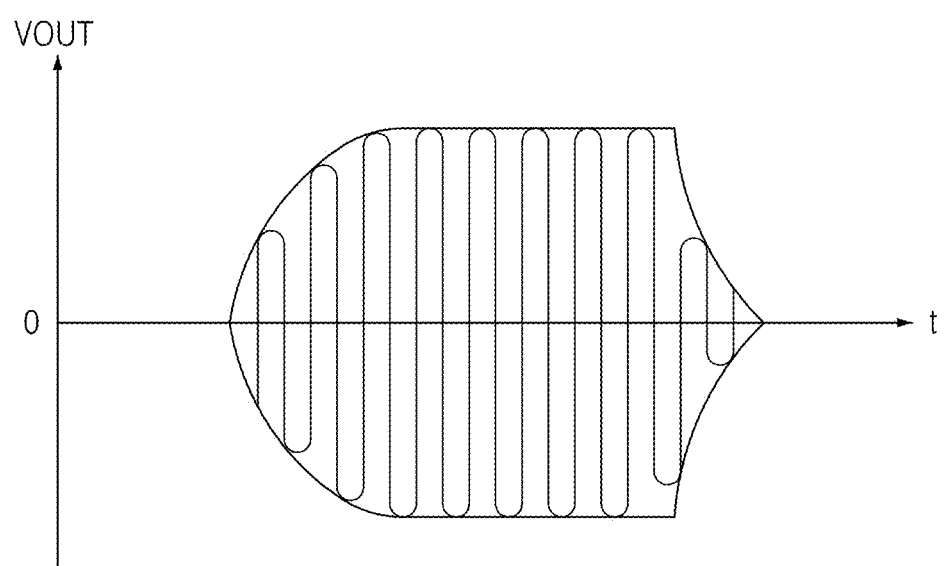
FIG. 15 depicts a waveform of an output signal when sequentially driving the amplifiers according to an exemplary embodiment in accordance with principles of inventive concepts.

FIG. 15 depicts a waveform of an output signal when sequentially driving amplifiers according to an exemplary embodiment in accordance with principles of inventive concepts. Referring to FIGS. 4, 6 to 10, 14, and 15, each of the plurality of drivers 300-1 to 300-$n$ is enabled based on each of the plurality of control signals CTRL1 to CTRLn which are sequentially activated. Accordingly, each of the plurality of drivers 300-1 to 300-$n$ may drive data DATA in response to a clock signal CLK.

Therefore, in accordance with principles of inventive concepts, each of the plurality of amplifiers 200-1 to 200-$n$ having a different amplification capability or amplification ratio amplifies a signal output from each of the plurality of drivers 300-1 to 300-$n$ and transmits the amplified signal to the antenna connection terminal 110.

As illustrated in FIG. 15, the output signal VOUT of the antenna connection terminal 110 has a waveform in which the overshoot and the undershoot are significantly reduced or removed.

Figure 16A:
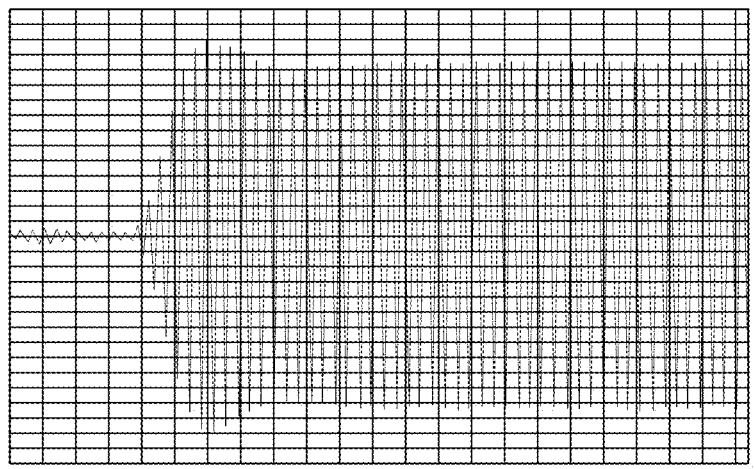
FIGS. 16A and 16B are waveform diagrams each depicting a conventional RF output characteristic of ISO 14443A and ISO 14443B.
Figure 16B:
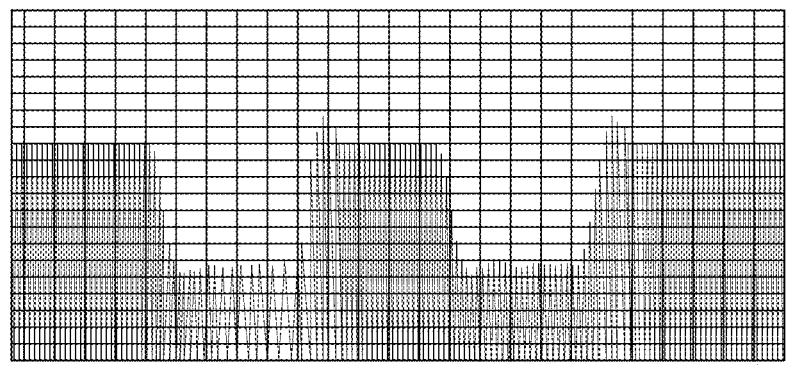

FIGS. 16A and 16B are waveform diagrams each depicting a conventional RF output characteristic of ISO 14443A and ISO 14443B.

FIG. 16A is a RF output characteristic of a conventional ISO 14443A, i.e., a RF output characteristic of a conventional reader. As illustrated in FIG. 16A, a RF signal output from an antenna of the reader includes a high overshoot and a high undershoot.

FIG. 16B is a RF output characteristic of a conventional ISO 14443B, i.e., a RF output characteristic of a conventional reader. As illustrated in FIG. 16B, a RF signal output from an antenna of the reader includes a high overshoot and a high undershoot.

Figure 17A:
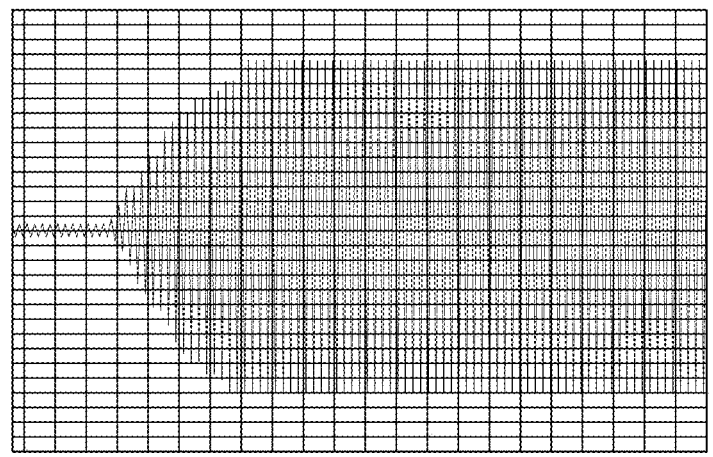
FIGS. 17A and 17B are waveform diagrams each depicting a RF output characteristic of ISO 14443A and ISO 14443B according to an exemplary embodiment in accordance with principles of inventive concepts.
Figure 17B:
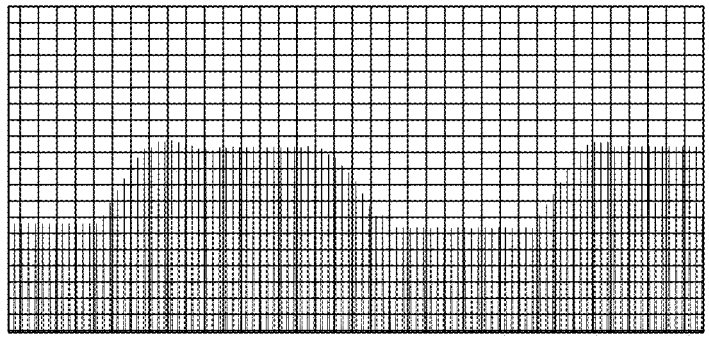

FIGS. 17A and 17B are waveform diagrams each depicting a RF output characteristic of ISO 14443A and ISO 14443B according to an exemplary embodiment in accordance with principles of inventive concepts. A RF signal, output from the RF transmission circuit 100 according to an exemplary embodiment in accordance with principles of inventive concepts, includes overshoot and undershoot which are considerably smaller than that of conventional readers, as demonstrated by a comparison between FIGS. 16A and 17A and between 176B and 17B. FIG. 17A depicts a RF output characteristic of a RF signal, i.e., ISO 14443A, output from the RF transmission circuit 100. When FIG. 17A is compared with FIG. 16A, the overshoot and the undershoot in FIG. 17A are considerably smaller than the overshoot and the undershoot in FIG. 16A. FIG. 17B depicts a RF output characteristic of a RF signal, i.e., ISO 14443B, output from the RF transmission circuit 100. When FIG. 17B is compared with FIG. 16B, the overshoot and the undershoot in FIG. 17B are considerably smaller than the overshoot and the undershoot of FIG. 16B.

Figure 18:
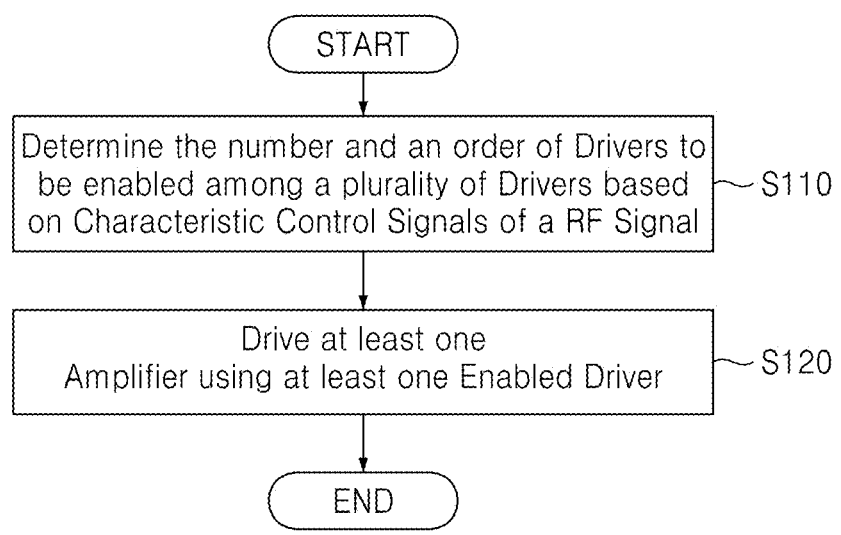
FIG. 18 depicts a flowchart for describing an operation of the RF transmission circuit according to an exemplary embodiment in accordance with principles of inventive concepts.

The flowchart of FIG. 18 depicts an exemplary embodiment of the operation of an RF transmission circuit in accordance with principles of inventive concepts. Referring to FIGS. 1 to 18, the control circuit 400 determines the number and the order of drivers to be enabled among a plurality of drivers based on characteristic control signals CI1, OI, or DS indicating a characteristic of a radio frequency (RF) signal to be transmitted through the antenna connection terminal 110 where the plurality of amplifiers 200 are connected in parallel (S110).

At least one enabled driver transmits a RF signal to at least one amplifier according to the determined order, the at least one amplifier amplifies the RF signal, and the amplified RF signal is transmitted to the antenna 101 through the antenna connection terminal 110 (S120).

By reducing or removing the overshoot and the undershoot occurring when transmitting signals, an RF transmission circuit and method in accordance with principles of inventive concepts may transmit signals (data or command, for example) with improved accuracy.

Although a few exemplary embodiments in accordance with principles of inventive concepts have been shown and described, it will be appreciated by those skilled in the art that changes may be made in these embodiments without departing from the principles and spirit of inventive concepts, the scope of which is defined in the appended claims and their equivalents.

What is claimed is:

1. A RF transmission circuit comprising:
   an antenna connection terminal;
   a plurality of amplifiers connected to the antenna connection terminal in parallel;
   a plurality of drivers for driving the plurality of amplifiers; and
   a control circuit controlling operation of each of the plurality of drivers based on characteristic information indicating a characteristic of a radio frequency (RF) signal to be transmitted through the antenna connection terminal.

2. The RF transmission circuit of claim 1, wherein each of the plurality of amplifiers has a different amplification capability.

3. The RF transmission circuit of claim 1, wherein each of the plurality of amplifiers is a class-D power amplifier.

4. The RF transmission circuit of claim 1, wherein the control circuit is to sequentially drive the plurality of drivers, based on the characteristic information.

5. The RF transmission circuit of claim 1, wherein the control circuit is to control the number of drivers to be enabled among the plurality of drivers, based on the characteristic information.

6. The RF transmission circuit of claim 1, wherein the characteristic information indicates potential overshoot or undershoot of the RF signal.

7. The RF transmission circuit of claim 1, further comprising a memory to store operation information corresponding to the characteristic information, and wherein the control circuit is to control each operation of the plurality of drivers based on the operation information.

8. A RF reader comprising:
the RF transmission circuit of claim 1; and
an antenna connected to the antenna connection terminal.

9. The RF reader of claim 8, wherein each of the plurality of amplifiers has a different RF amplification capability.

10. A wireless communication device comprising:
the RF transmission circuit of claim 1;
an antenna connected to the antenna connection terminal; and
a controller controlling operation of the RF transmission circuit.

11. The wireless communication device of claim 10, wherein the control circuit is to determine the number and the order of drivers to be enabled among the plurality of drivers, based on the characteristic information.

12. A RF transmission circuit comprising:
an antenna connection terminal;
a plurality of amplifiers connected to the antenna connection terminal in parallel;
a plurality of drivers for driving the plurality of amplifiers;
a measuring circuit to measure a characteristic of a radio frequency(RF) signal to be transmitted through the antenna connection terminal, and to output a plurality of measuring signals; and
a control circuit to control operation of each of the plurality of drivers based on the plurality of measuring signals.

13. A RF reader comprising:
the RF transmission circuit of claim 12; and
an antenna connected to the antenna connection terminal.

14. A wireless communication device comprising:
the RF transmission circuit of claim 12;
an antenna connected to the antenna connection terminal; and
a controller to control operation of the RF transmission circuit.

15. A contactless smart card reader, comprising:
an antenna connection terminal;
a plurality of amplifiers connected in parallel to the antenna connection terminal;
a controller configured to control the plurality of amplifiers based on characteristics of a signal to be transmitted by the contactless smart card reader.

16. The smart card reader of claim 15 further comprising semiconductor memory, wherein characteristics of the signal to be transmitted are stored within the semiconductor memory.

17. The smart card reader of claim 15 further comprising a feedback circuit connected to the antenna connection terminal to determine the characteristics of the signal.

18. The smart card reader of claim 15, wherein the controller is to operate the plurality of amplifiers to reduce overshoot and undershoot of the signal to be transmitted by the contactless smart card reader.

19. The smart card reader of claim 18, wherein the controller activates an increasing number of amplifiers in sequence to form a signal having reduced overshoot.

* * * * *